Sept. 23, 1924.   O. H. BREMSER   1,509,188
THRASHER
Filed Sept. 26, 1919    4 Sheets-Sheet 4
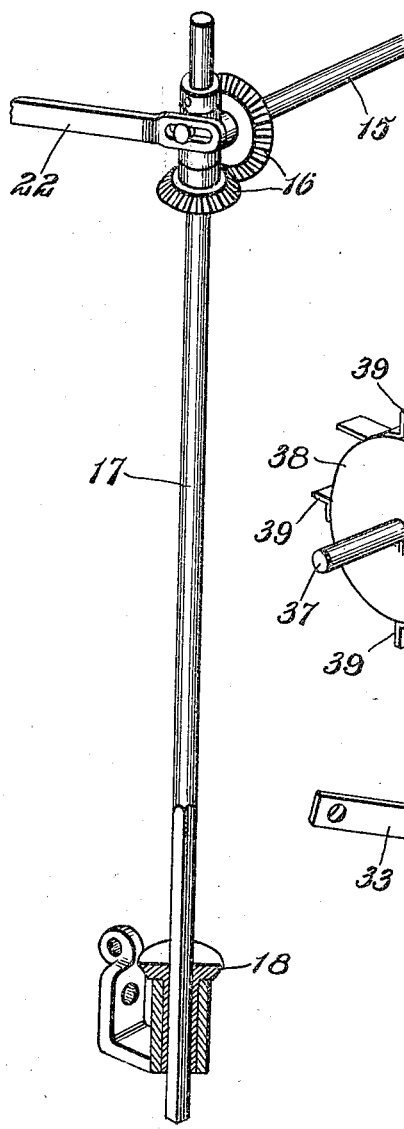
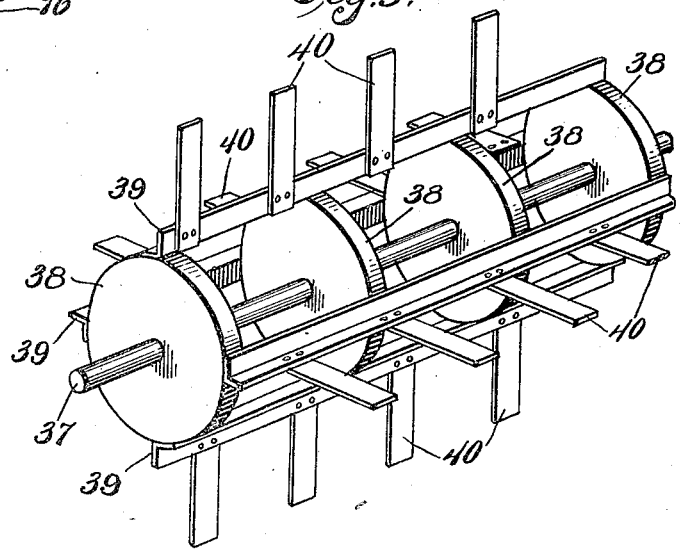
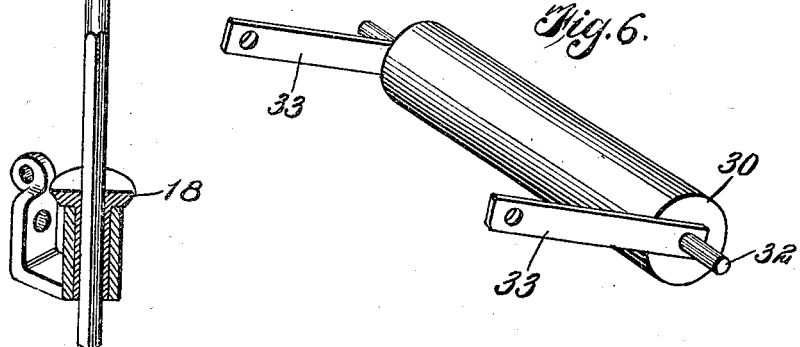
Inventor
O. H. Bremser
By Victor J. Evans
Attorney
Witnesses
J. R. Heinrichs Patented Sept. 23, 1924.

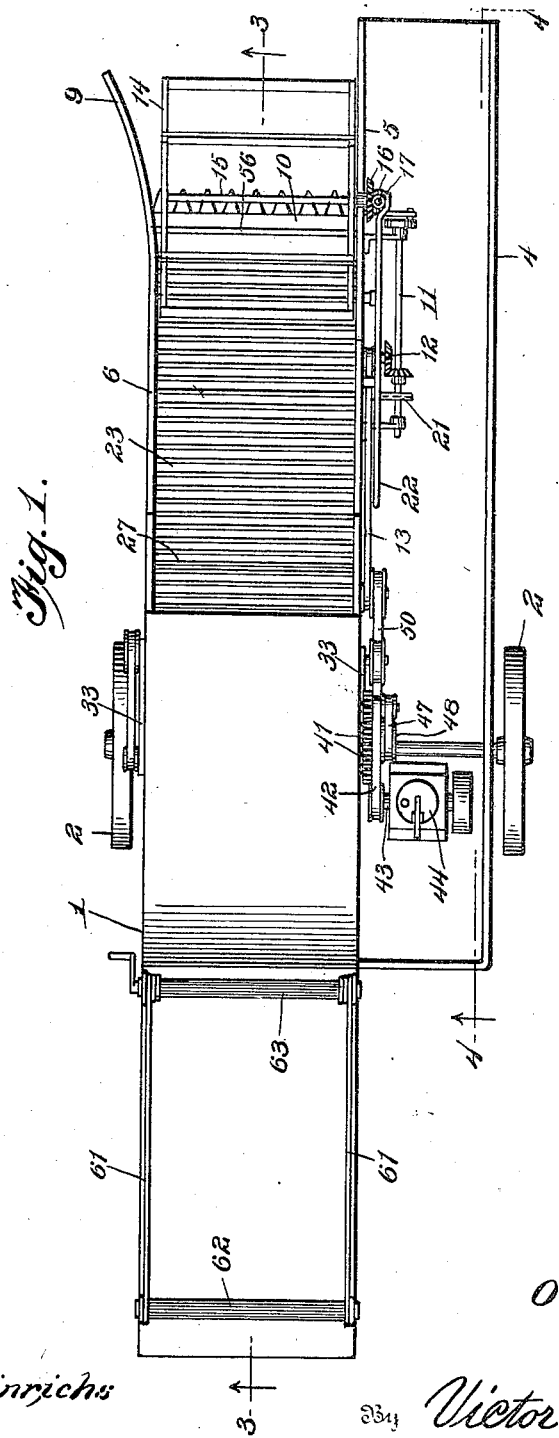

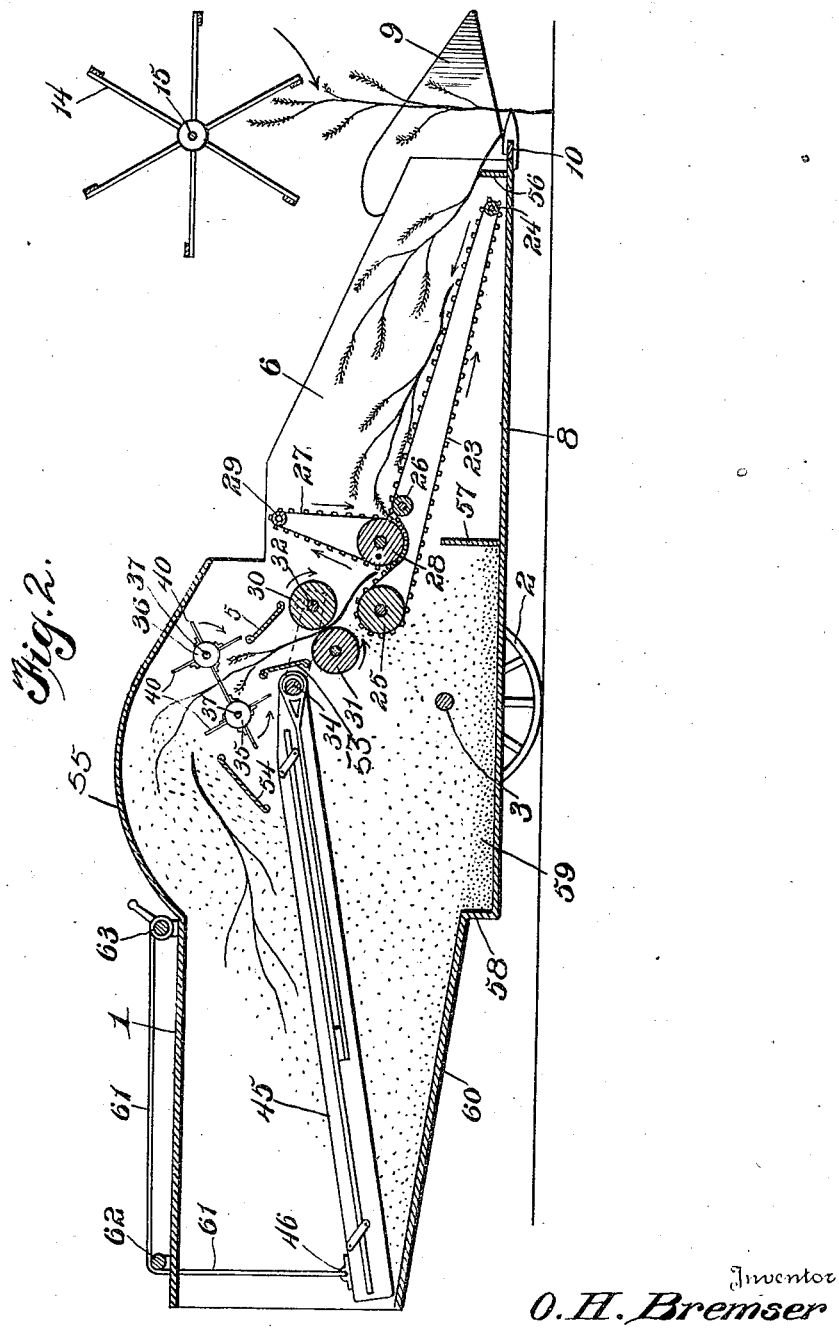

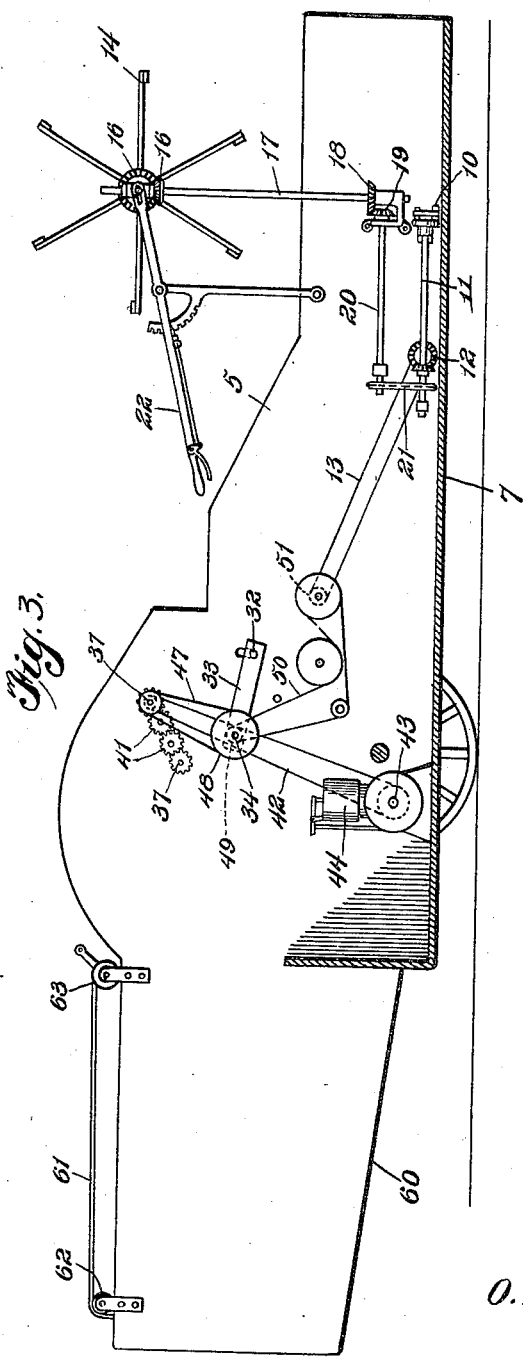

1,509,188

UNITED STATES PATENT OFFICE.

OSCAR H. BREMSER, OF COLUMBIA, ILLINOIS.

THRASHER.

Application filed September 26, 1919. Serial No. 326,457.

*To all whom it may concern:*

Be it known that I, OSCAR H. BREMSER, a citizen of the United States of America, residing at Columbia, in the county of Monroe and State of Illinois, have invented new and useful Improvements in Thrashers, of which the following is a specification.

This invention relates to an improvement in clover thrashers whereby clover is delivered onto an endless conveyor to and beneath a pressure roller, and thence to retarding rollers, beyond which retarding rollers the seed carrying portion of the stalk is subjected to the action of beaters while the stalk proper is held between the retarding rollers. The beaters loosen and separate the seed from the stalk and the mass falls upon a shaking screen thru which complete separation of the seed is effected and the stalks discharged from the end of the machine, while the seed delivered thru the screen is stored in a receptacle below the same.

One of the essential objects of the present invention is the provision of means whereby the stalks upon the conveyor are subjected to a certain pressing action, whereby the seed bearing portions are more or less confined or compressed in order that the seed may be readily beaten therefrom.

A further object of the invention is the provision of beaters so arranged as to exert a pull upon the stalks, combined with which beaters are retarding rollers thru which the stalks are passing while the beaters are acting upon the seed bearing portions thereof. In this way the beaters act not only to separate or partly separate the seed from the stalks, but to exert a pull upon the stalks so that they will be readily drawn thru the retarding rollers, and the operation of the machine thereby made more effective.

In the drawings:—

Figure 1 is a plan view of the improved machine.

Figure 2 is a longitudinal-vertical section of the same.

Figure 3 is a section on line 4—4 of Fig. 1.

Figure 4 is a detail perspective of the shaft 17 and its connections.

Figure 5 is a perspective view of one of the beaters.

Figure 6 is a detail perspective of one retarding roller.

Similar numerals of reference designate corresponding parts in all of the views of the drawings.

The thrasher in the preferred embodiment illustrated comprises a body 1 mounted upon ground wheels 2, supported upon a main axle 3, which passes through the body, as shown. The body preferably comprises three upright walls 4, 5, and 6, arranged in spaced parallel relation, the walls 4 and 5, being connected by the bottom 7 and constituting a housing for the gasoline engine and such details, while the walls 5 and 6 are connected by a bottom 8, and constitute a housing for the harvesting and threshing mechanism.

The forward end of wall 6 terminates in rear of the forward end of the wall 5, and has a flaring guide section 9, at such forward end forming a flaring entrance between the walls 5 and 6. A reciprocating cutter 10 of any usual or preferred type is mounted in line with the bottom 8 at the forward end of the wall 6 and is driven thru a shaft 11 operated from a gear 12, which latter is driven by a belt 13 from the motor mechanism in a manner to be later described. Operating above the cutter bar is a skeleton reel 14, the function of which is to turn the stalks cut by the cutter onto the conveying belt to be noted. The reel 14 is mounted upon a shaft 15 driven thru a geared connection 16, from a shaft 17, which latter has connection thru a bevel gear 18, with a gear pinion 19, mounted upon a longitudinal suitably supported shaft 20. The shaft 20 is driven thru a chain drive 21 from the shaft 11, so that the reel is driven in accordance with the drive of the cutter bar as will be plain from Figure 3. The shaft 17 is preferably squared at its lower end, and fits slidably in a squared opening in the beveled gear 18, so that a suitably mounted hand lever 22, may be used to vertically adjust the reel with respect to the cutter bar, in order to compensate for clover stalks of different heights, as will be understood.

An endless conveyor 23, is mounted in the mechanism housing, with its lower forward end immediately in rear of the cutter bar, and its upper end above and to the rear of such lower end. The conveyor 23 which is preferably of slatted endless type, is supported at its lower forward end over an idle roller 24 and at its upper end over a drive roller 25, a second idler 26, supporting the upper portion of the conveyor, in advance of the drive roller 25. Between the rollers 25 and 26 of the main conveyor there is disposed an auxiliary pressure conveyor 27, operating at an angle to the main conveyor, and traveling at its lower end over a drive roller 28 and at its upper end over an idler 29. The auxiliary or pressure conveyor 27 is also preferably of the slatted endless type and the drive roller 28 is so arranged with respect to the main conveyor as to exert a material pressure upon the upper surface thereof between the rollers 25 and 26. In other words, the respective main and auxiliary conveyors travel throughout a considerable portion of the surface of the roller 28 in actual contact, with considerable pressure between them, so that any material traveling lengthwise of the main conveyor is forced between the main and auxiliary conveyors and compacted, in order to permit a more effective threshing operation. Furthermore the meeting at the entrance end of the main and auxiliary conveyors and also the meeting of the exit portion of said contacting conveyors is approximately at a 45 degree angle to the plane of the main conveyor, so that the material entering between these two conveyors is moved downwardly, and such material on leaving from between these conveyors is directed upwardly, as will be apparent from Figure 2 of the drawings.

Beyond the main conveyor drive roll 25 and upwardly beyond the same are arranged the retarding rolls 30 and 31. The roll 31 is mounted for rotation upon fixed bearings, while the roll 30 is movable with respect to the roll 31, in order that a yielding pressure may be had to compensate for different thicknesses of material passing therebetween. To secure this compensation, the roll 30 is mounted upon a shaft 32, in turn supported on arms 33, the remote ends of which are pivotally supported upon a shaft 34, which has an additional function to be later described. The meeting faces of the retarding rolls 30 and 31 are in line with or in the plane of movement of the stalks passing upwardly, as before noted, from between the main and auxiliary conveyors, so that said stalks will be directed between the retarding rolls in the normal feeding lengthwise of the main conveyor. Upwardly beyond the retarding rolls are arranged the beaters 35 and 36. These beaters each comprise a shaft 37 supporting a series of spaced disks 38, which disks are connected by tie rods 39 which may be and preferably are arranged directly transversely to the disks, and on which tie rods are mounted the beating arms 40, consisting of an appropriate length of thick heavy flexible material as canvas. These beaters are arranged so that the arms 40 of one are opposed to the arms 40 of the other, that is when a particular arm is in operative position, the adjacent arm of the other beater is also in operative position, Figure 2. This insures an effective successive beating operation from the respective arms of the beaters, in order that all the seeds may be readily loosened from the stalks. The shafts 37 of the respective beaters are connected beyond the wall 5, by intermediate gears 41, whereby said beaters are driven in the proper direction, while one of said shafts is connected by a belt 42, with the power shaft 43, herein shown as the drive shaft of a gasoline engine 44.

The shaft 34 herein-before referred to supports a shaking screen 45, the free or lower end of which is supported upon any appropriate member 46, and the operative end eccentrically mounted so that movement of the shaft 34 will impart a reciprocatory shaking movement to the screen, as is usual in screens of this type. The screen preferably inclines downwardly toward the rear of the machine and the forward end of the screen is in a position below or approximately in line with the lowermost beater 36, so that the material shaken from the stalks by the beaters will fall upon the screen, as will be apparent from Figure 3 of the drawings.

The shaft 37 is connected by a belt 47 with a drive wheel 48 secured upon said shaft 34, and a belt wheel 49 on said shaft 34 carries a belt 50 which passes over and around the pulleys upon the extension of the shaft of the conveyor rolls 25 and 28, whereby power is imparted to these conveyors. The shaft of the conveyor roll 28 is also provided with belt wheel 51, over which the belt 13 is trained. Power is thus transmitted to the cutter and to the reel 14.

As the beaters in operation generate considerable air current which might have a retarding effect or at least a spreading effect upon any loose portions of the stalks, there are provided opposed plates 53, 53 in position intermediate the retarding rolls and beaters, and constituting in effect a funnel-like member through which the stalks pass from the retarding rolls to the beaters, and which funnel-like member interferes with the air current from the beaters to prevent any appreciable effect therefrom on the stalks. A similar air deflecting wall 54 is arranged beyond the beaters and above the shaking screen, this wall serving to deflect the air current created by the beaters from the material on the surface of the screen, and being so arranged that the stalks from the beaters pass over the same, as clearly shown in Figure 3 of the drawing.

The mechanism housing between the walls 5 and 6 of the body is preferably provided with a top or cover 55, which extends from a point slightly in advance of the beaters to the rear of the machine. The bottom 8 of the mechanism housing is also provided in rear of the cutters with a retarding wall 56, which acts to retard the stalks or to deflect their lower ends as they pass from the cutters, and said wall is also provided at a point below the auxiliary conveyor with an upstanding wall 57, which together with a rear offset formed in the bottom 8 as at 58, provides a receptacle 59, to receive the seed. The bottom wall 8 beyond the offset 58 to the rear end of the machine inclines downwardly toward the front, as shown at 60, thereby directing any seed which may fall upon this point to the seed receptacle 59. The support 46 for the rear or free end of the shaking screen is here shown as a cable 61 connected to the rear end of the machine, and passing over an idler 62 mounted upon the top of the mechanism housing, and forwardly to a drum 63 adapted to be operated and held in adjusted position in any suitable manner. By this means the free or rear end of the screen can be raised or lowered at will, in order to give the desired inclination to the screen for the proper discharge of the material thereover.

The machine is preferably drawn over the field, and the clover stalks are directed between the wall 5 and the flaring entrance 9. Such stalks are cut by the cutter bar 10 and their upper ends directed rearwardly by the reel 14. The stalks are thus deposited upon the main conveyor 23 and pass upwardly and beneath the auxiliary conveyor, where they are more or less compacted and directed upwardly between the retarding rolls. Manifestly the conveyor 27 assures compacting of the stalks and at the same time assists in the positive feed of the stalks toward the left in Figure 2. When passing between the retarding rolls the rear or lower ends of the stalks are held or approximately so while the beaters are operating upon the seed or seeded portions of such stalks. The beaters by reason of their comparatively rapid rotation act to exert a pull upon the stalks, so that the beaters assist in drawing the stalks from between the retarding rolls. The seed is brushed from the stalks by the action of the beaters and the seed and stalks are then moved upon the shaking screen, where in the operation of such screen the seed is separated from the stalks and other refuse and allowed to pass thru the screen down on to the bottom 8 and gradually find its way into the receptacle 59, the unused portions of the stalks are then deflected over the rear end of the screen and discharged upon the ground as the machine is acting.

An essential feature of the present machine is the combination of the main and auxiliary conveyors whereby the stalks are properly compacted and directed toward the retarding rolls, combined with beaters so arranged as to exert a pull upon the stalks so that they will be effectively flattened out between such beaters and the grip on such stalks by said retarding rolls. This insures a more effective action of the beaters and a more complete separation of the seed therefrom.

The driving connections shown in Figure 2 include pulleys 25', 31', 32' and 34', and belts complementary to the pulleys 25'—31' and 32'—34', respectively.

Having described the invention what is claimed is:—

1. A clover thresher comprising a body, a main conveyor therein, means to direct stalks on to the conveyor, beating means including flexible cooperating arms at opposite sides of the path of the stalks arranged beyond the conveyor, and a cooperating conveyor arranged at an angle to the main conveyor and also arranged in advance of the beating means to compress the stalks while assisting the feed of and directing the same.

2. A clover thresher, comprising a body, a main conveyor therein, retarding means operating in rear of and above the main conveyor at an angle to the main conveyor, an auxiliary conveyor cooperating with the main conveyor and deflecting a portion thereof so as to direct the stalks passing therethrough to the retarding means and to assist in feeding the stalks while compressing the same, and opposed rotary beaters operating beyond the retarding means and having flexible striking arms subject to centrifugal action and disposed at opposite sides of the path of the stalks to cooperate with each other.

3. A clover thresher comprising a main conveyor, stalk threshing means in rear of said conveyor, an auxiliary conveyor bearing upon and cooperating with the main conveyor, at an angle thereto, said auxiliary conveyor deflecting a portion of the main conveyor and also compressing the stalks while assisting in the feed thereof, in order that the stalks may be directed to the threshing means and means to strike the stalks without crushing or rubbing the same.

In testimony whereof I affix my signature.

OSCAR H. BREMSER.